(12) United States Patent
Liu et al.

(10) Patent No.: US 10,846,587 B2
(45) Date of Patent: Nov. 24, 2020

(54) DEEP NEURAL NETWORKS FOR TARGETED CONTENT DISTRIBUTION

(71) Applicant: Microsoft Technology Licensing, LLC, Redmond, WA (US)

(72) Inventors: Haishan Liu, Sunnyvale, CA (US); Huiji Gao, San Jose, CA (US); Jianling Zhong, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 730 days.

(21) Appl. No.: 15/664,214

(22) Filed: Jul. 31, 2017

(65) Prior Publication Data

US 2019/0034783 A1    Jan. 31, 2019

(51) Int. Cl.
*G06N 3/04*    (2006.01)
*G06N 3/08*    (2006.01)
*G06N 5/02*    (2006.01)

(52) U.S. Cl.
CPC ......... *G06N 3/0436* (2013.01); *G06N 3/0427* (2013.01); *G06N 3/08* (2013.01); *G06N 3/084* (2013.01); *G06N 5/022* (2013.01)

(58) Field of Classification Search
None
See application file for complete search history.

(56) References Cited

U.S. PATENT DOCUMENTS

| | | | |
|---|---|---|---|
| 9,680,923 B1* | 6/2017 | Jain | H04L 67/20 |
| 2012/0215640 A1* | 8/2012 | Ramer | G06Q 30/0269 |
| | | | 705/14.55 |
| 2016/0012485 A1* | 1/2016 | Dong | G06Q 30/0263 |
| | | | 705/14.6 |
| 2017/0330220 A1* | 11/2017 | Korada | G06F 30/20 |
| 2018/0075493 A1* | 3/2018 | Agarwal | G06Q 30/0275 |
| 2020/0034887 A1* | 1/2020 | Hamedi | G06Q 30/0277 |

* cited by examiner

*Primary Examiner* — Alan Chen
(74) *Attorney, Agent, or Firm* — Hickman Palermo Becker Bingham LLP

(57) ABSTRACT

Herein are techniques to use an artificial neural network to score the relevance of content items for a target and techniques to rank the content items based on their scores. In embodiments, a computer uses a plurality of expansion techniques to identify expanded targets for a content item. For each of the expanded targets, the computer provides inputs to an artificial neural network to generate a relevance score that indicates a relative suitability of the content item for that target. The computer ranks the expanded targets based on the relevance score generated for each of the expanded targets. Based on the ranking, the computer selects a subset of targets from the available expanded targets as the expanded targets for whom the content item is potentially most relevant. The computer stores an association between the content item and each target in the subset of expanded targets.

20 Claims, 9 Drawing Sheets

DEEP NEURAL NETWORKS FOR TARGETED CONTENT DISTRIBUTION

TECHNOLOGICAL FIELD

The present disclosure relates to automatic matching of resources to entities and, more specifically, to improvements in evaluation and ranking of potential matches to increase the suitability of actual matches and decrease the critical path of a live production system for the match making.

BACKGROUND

A computer may maintain an inventory of resources to be provided to entities in a just in time fashion. Automation may match resources to entities based on configurable suitability criteria. Furthermore, matching may occur online in real time at a live production system such as a content server or a transactional server. However, scalability may be problematic. For example, the automation may inventory thousands of resources that may be shared with thousands of entities. The immensity of data for potential matches may impose unacceptable latency. For example, exhaustive exploration of potential matches may be suited to bulk synchronous processing such as with MapReduce, which may be too slow or too resource intensive for transactional environments.

Furthermore, match making based on limited and rigid criteria may reduce the suitability of matches. In hindsight, measuring empirically observed suitability based on actual entity responses may be more or less straightforward. However, estimate-based prediction of suitability of proposed matches of entities to resources may be less robust and prone to inaccuracy. For example, suitability may be based on subjective or temporal details that are difficult to discretely encode. To some extent, accuracy and predictability may be achieved with processing complexity such as analytics. However, complexity tends to impact latency. Thus, there may be a difficult and unpredictable tradeoff between accuracy and latency. Techniques such as linear programming may be inadequate to well balance such conflicting goals. Thus, new techniques are needed to achieve efficiency and accuracy.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
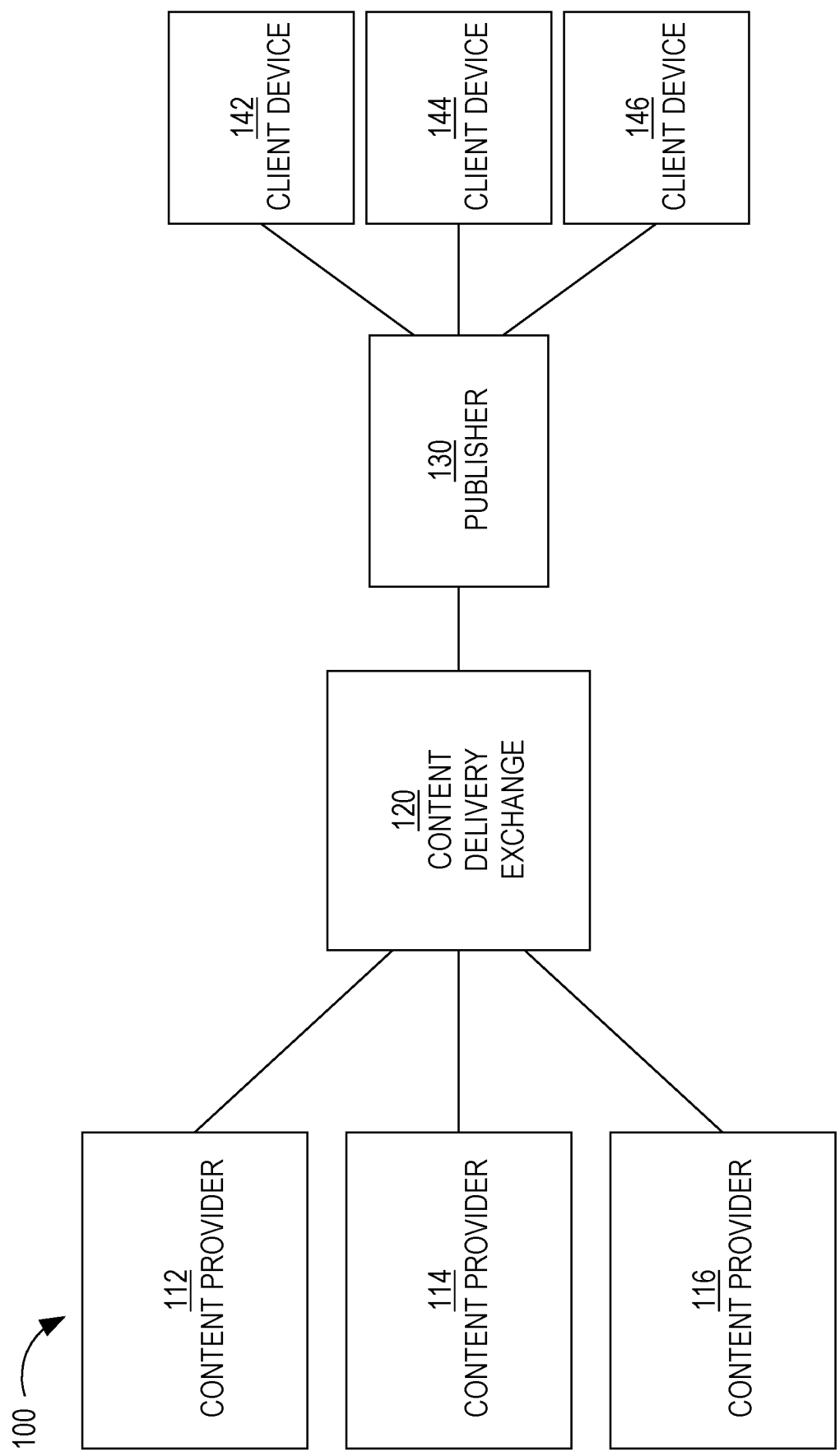
FIG. 1 is a block diagram of a computer that matches content items to targets, in which various embodiments may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Herein are techniques to use an artificial neural network to score the relevance of a content item for various targets and techniques to rank the targets based on their scores. These techniques need not be performed in a live transactional production environment. For example, a laboratory cluster of computers or a solitary personal computer are sufficient. However, the data generated by these techniques may be employed in a live transactional production environment. Also, these techniques may consume historical data gathered in a live transactional production environment. The precomputation, preselection, and prepositioning of these techniques may reduce the amount of data and processing needed in a live transactional production environment in order to maximize match targets with content items most relevant to them. Thus, these techniques may shift demand for processing time and data access from a critical path of a live environment to a bulk processing and scheduled environment such as a laboratory or secondary data center. Thus, the data that these techniques generate may accelerate the execution of a live transactional production computer.

In embodiments, a computer uses a plurality of expansion techniques to identify expanded targets for a content item. For each of the expanded targets, the computer provides inputs to an artificial neural network to generate a relevance score that indicates a relative suitability of the content item for that target. The inputs may be based on attributes and characteristics of the content item and the target. The computer ranks the expanded targets based on the relevance score generated for each of the expanded targets. There may be too many expanded targets to foreseeably use. Thus, based on the ranking, the computer selects a subset of targets from the available expanded targets as the expanded targets for whom the content item is potentially most relevant. The computer stores an association between the content item and each target in the subset of expanded targets.

In embodiments, each feature that is extracted from a content item, target, and/or sessional context is mathematically distilled into a meaningful scalar numeric value that is fed into the artificial neural network as stimulus input for training or relevance scoring. After training, the artificial neural network may be encoded into a matrix for efficient execution. Ranking may be based on absolute relevance scores or based on comparisons between relevance scores relative to a given target to establish individualized preferences of the target for various content items. Thus, ranking may be based on relevance or preference. To accelerate training or to train for a target having little or no observed preferences, a global neural network may be shared to score content items for many targets and may be used as a prototype from which dedicated individual neural networks may be cloned and separately trained.

System Overview

FIG. 1 is a block diagram that depicts a system 100 for distributing content items to one or more end-users, in an embodiment. System 100 includes content providers 112-116, a content delivery exchange 120, a publisher 130, and client devices 142-146. Although three content providers are depicted, system 100 may include more or less content providers. Similarly, system 100 may include more than one publisher and more or less client devices.

Content providers 112-116 interact with content delivery exchange 120 (e.g., over a network, such as a LAN, WAN, or the Internet) to enable content items to be presented, though publisher 130, to end-users operating client devices 142-146. Thus, content providers 112-116 provide content items to content delivery exchange 120, which in turn selects content items to provide to publisher 130 for presentation to users of client devices 142-146. However, at the time that content provider 112 registers with content delivery exchange 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery exchange 120.

Although depicted in a single element, content delivery exchange 120 may comprise multiple computing elements and devices, connected in a local network or distributed regionally or globally across many networks, such as the Internet. Thus, content delivery exchange 120 may comprise multiple computing elements, including file servers and database systems.

Publisher 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher 130 (and/or its affiliates). A content request may be a request that is immediately preceded by user input (e.g., selecting a hyperlink on web page) or may initiated as part of a subscription, such as through a Rich Site Summary (RSS) feed. In response to a request for content from a client device, publisher 130 provides the requested content (e.g., a web page) to the client device.

Simultaneously or immediately before or after the requested content is sent to a client device, a content request is sent to content delivery exchange 120. That request is sent (over a network, such as a LAN, WAN, or the Internet) by publisher 130 or by the client device that requested the original content from publisher 130. For example, a web page that the client device renders includes one or more calls (or HTTP requests) to content delivery exchange 120 for one or more content items. In response, content delivery exchange 120 provides (over a network, such as a LAN, WAN, or the Internet) one or more particular content items to the client device directly or through publisher 130. In this way, the one or more particular content items may be presented (e.g., displayed) concurrently with the content requested by the client device from publisher 130.

In response to receiving a content request, content delivery exchange 120 initiates a content item selection event that involves selecting one or more content items (from among multiple content items) to present to the client device that initiated the content request. An example of a content item selection event is an auction.

Content delivery exchange 120 and publisher 130 may be owned and operated by the same entity or party. Alternatively, content delivery exchange 120 and publisher 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 120, and that bids for space (on one or more publishers, such as publisher 130) to present content items on behalf of multiple content providers. Thus, a bidder is another source of content items that content delivery exchange 120 may select for presentation through publisher 130. Thus, a bidder acts as a content provider to content delivery exchange 120 or publisher 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery exchange 120. A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view the set of content items, select or click on the set of content items, or when a certain number of users purchase a product/service associated with the content delivery campaign or fill out a particular form on a website.

A content delivery campaign may specify one or more targeting criteria that are used to determine whether to present a content item of the content delivery campaign to one or more users. Example factors include date of presentation, time of day of presentation, characteristics of a user to which the content item will be presented, attributes of a computing device that will present the content item, identity of the publisher, etc. Examples of characteristics of a user include demographic information, residence information, job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 120 receives, from a computing device, a request that does not satisfy the targeting criteria, then content delivery exchange 120 ensures that any content items associated with the particular content delivery campaign are not sent to the computing device.

Thus, content delivery exchange 120 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery campaign 120 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher 130 may not satisfy targeting criteria of one content item of a campaign, the same content request may satisfy targeting criteria of another content item of the campaign.

Different content delivery campaigns that content delivery exchange 120 manages may have different charge models. For example, content delivery exchange 120 may charge a content provider of one content delivery campaign for each presentation of a content item from the content delivery campaign (referred to herein as cost per impression or CPM). Content delivery exchange 120 may charge a content provider of another content delivery campaign for each time a user interacts with a content item from the content delivery campaign, such as selecting or clicking on the content item (referred to herein as cost per click or CPC). Content delivery exchange 120 may charge a content provider of another content delivery campaign for each time a user performs a particular action, such as purchasing a product or service, downloading a software application, or filling out a form (referred to herein as cost per action or CPA). Content delivery exchange 120 may manage only campaigns that are of the same type of charging model or may manage campaigns that are of any combination of the three types of charging models.

A content delivery campaign may be associated with a resource budget that indicates how much the corresponding content provider is willing to be charged by content delivery exchange 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items are considered and a subset selected for presentation on a computing device in response to a request. Thus, each content request that content delivery exchange 120 receives triggers a content item selection event.

For example, in response to receiving a content request, content delivery exchange 120 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 120 receives content requests that are initiated by the users. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated or the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery exchange 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction, or simply an "ad auction."

In one embodiment, content delivery exchange 120 conducts one or more content item selection events. Thus, content delivery exchange 120 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that owns and operates content delivery exchange 120 conducts one or more content item selection events. In this latter embodiment, content delivery exchange 120 sends one or more content items to the other exchange, which selects one or more content items from among multiple content items that the other exchange receives from multiple sources. In this embodiment, content delivery exchange 120 does not know (a) which content item was selected if the selected content item was from a different source than content delivery exchange 120 or (b) the bid prices of each content item that was part of the content item selection event. Thus, the other exchange may provide, to content delivery exchange 120 (or to a performance simulator described in more detail herein), information regarding one or more bid prices and, optionally, other information associated with the content item(s) that was/were selected during a content item selection event, information such as the minimum winning bid or the highest bid of the content item that was not selected during the content item selection event.

Tracking User Interactions

Content delivery exchange 120 tracks one or more types of user interactions across client devices 142-146 (and other client devices not depicted). For example, content delivery exchange 120 determines whether a content item that content delivery exchange 120 delivers is presented at (e.g., displayed by or played back at) a client device. Such a "user interaction" is referred to as an "impression." As another example, content delivery exchange 120 determines whether a content item that exchange 120 delivers is selected by a user of a client device. Such a "user interaction" is referred to as a "click." Content delivery exchange 120 stores such data as user interaction data, such as an impression data set and/or a click data set.

For example, content delivery exchange 120 receives impression data items, each of which is associated with a different instance of an impression and a particular content delivery campaign. An impression data item may indicate a particular content delivery campaign, a specific content item, a date of the impression, a time of the impression, a particular publisher or source (e.g., onsite v. offsite), a particular client device that displayed the specific content item, and/or a user identifier of a user that operates the particular client device. Thus, if content delivery exchange 120 manages multiple content delivery campaigns, then different impression data items may be associated with different content delivery campaigns. One or more of these individual data items may be encrypted to protect privacy of the end-user.

Similarly, a click data item may indicate a particular content delivery campaign, a specific content item, a date of the user selection, a time of the user selection, a particular publisher or source (e.g., onsite v. offsite), a particular client device that displayed the specific content item, and/or a user identifier of a user that operates the particular client device.

Relevance Scoring and Ranking

Figure 2:
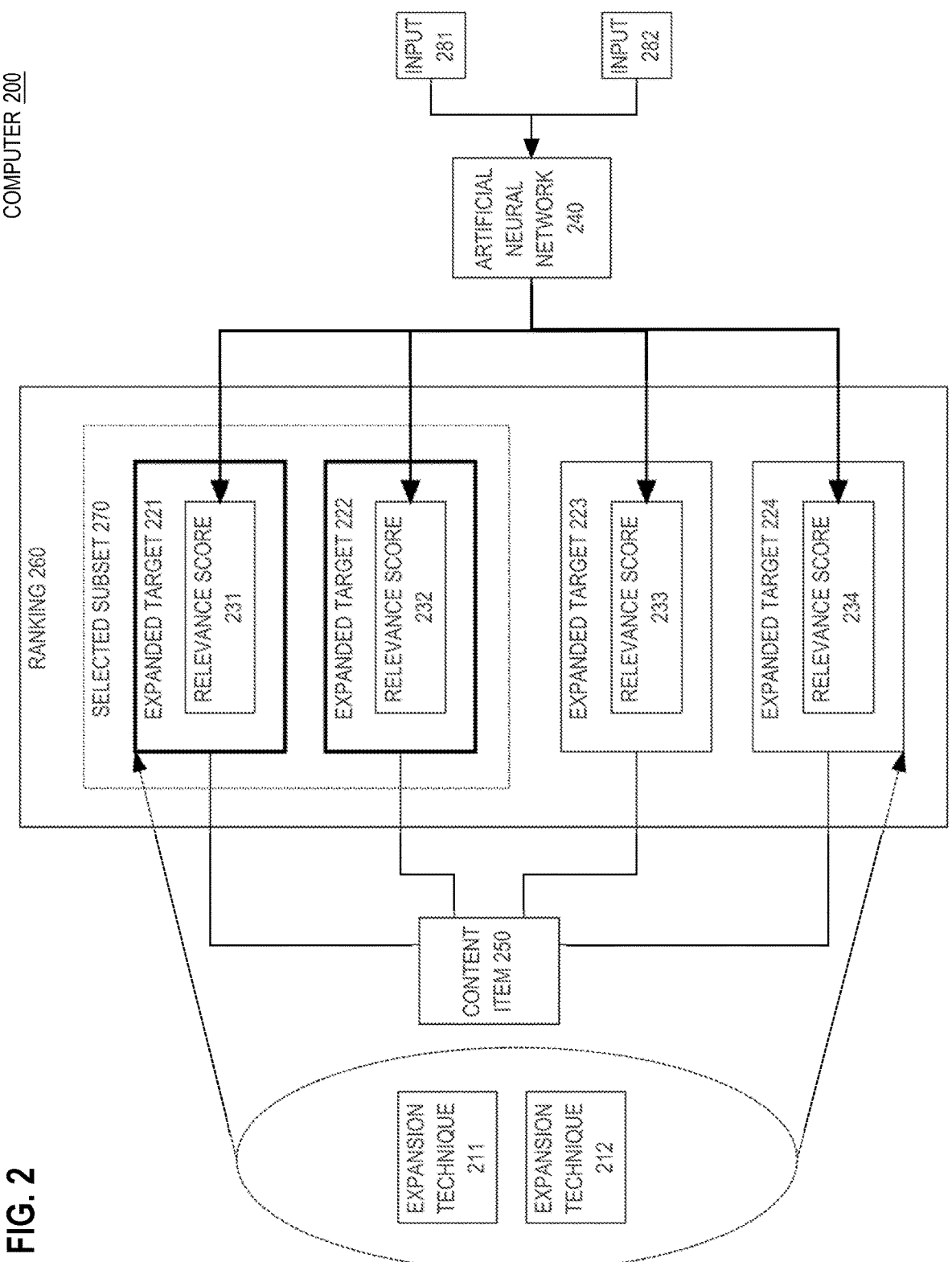
FIG. 2 is a block diagram of a computer that uses an artificial neural network to score the relevance of content items for a target and ranks the content items based on their scores, in which various embodiments may be practiced.

FIG. 2 is block diagram of a computer 200 in which various embodiments may be practiced. Computer 200 uses an artificial neural network to score the relevance of content item for various targets and ranks the targets based on their scores.

The various components of computer 200 are implemented at least partially by hardware at one or more computing devices, such as one or more hardware processors executing instructions stored in one or more memories for performing various functions described herein. Computer 200 illustrates only one of many possible arrangements of components configured to perform the functionality described herein. Other arrangements may include fewer or different components, and the division of work between the components may vary depending on the arrangement. The components shown for computer 200 may be encoded as logic or data structures within the volatile memory or durable storage of computer 200 or within remote equipment accessed by computer 200, such as network attached storage.

Although not shown, computer 200 may operate in phases. In a first phase, computer 200 may create artificial neural network 240 within the memory of computer 200. Computer 200 may train artificial neural network 240 to evaluate the suitability of content items, such as 250, for a target, such as 221-224. For example, artificial neural network 240 may be trained to emit a relevance score, such as 231-234, that indicates the relevance of a given content item with respect to a given target.

Targets 221-224 may each be a person, an online user, client software, a requirement, or other object for which various content items may be more or less relevant. Content item 250 may be a document, a record, an advertisement, an object, or a partial object. Content item 250 may have aspects that make it more relevant to some targets than to other targets. For example, targets 221-224 may each be a work request, and content item 250 may be one of several (not shown) resources that function as substitutes that may be used to fulfill some or all of those work requests.

Computer 200 may predict which targets might be most interested in particular content items. Computer 200 may select a particular content item, without initially knowing which targets might be interested in the particular content item. Associated with the particular content item are targeting (i.e. matching) criteria (not shown) that identify characteristics that a target should have in order to be matched with the particular content item. For example, content item 250 may have a criterion that matches targets in a geographic locale.

A target that satisfies the targeting criteria of a content item is an exact target (not shown). For example, with each content item, computer 200 may encode the targeting criteria of the content item into a database query of a table of targets. Computer 200 may submit that query to identify a set of exact targets for the content item, which computer 200 may persist for later reference in a live transactional production environment.

However, some content items may have few or no exact matches. To ensure that a content item has at least a threshold amount of targets, the expansion phase supplements the exact targets with expanded targets, such as 221-224. An expanded target is a target that has one or more attributes or characteristics with the same data values as those of the exact targets. In other words, an expanded target is similar to one or more exact targets in one or more ways. For example, computer 200 may identify expanded targets 221-224 based on their similarity to exact targets of content item 250.

During the expansion phase as shown, computer 200 may execute one or more expansion techniques, such as 211-212, to identify expanded targets, such as 221-224, for which content item 250 may be relevant. Expansion techniques 211-212 may each encode a different heuristic, rule, or other logic that may propose expanded targets based on their similarity to exact targets. For example, expansion technique 211 may identify expanded targets that are in a same geographic locale as the majority of exact targets. However, because expansion techniques 211-212 are different, the suitability of the expanded targets they identify may be mixed. Furthermore, computer 200 may identify more expanded targets than are needed for a content item. Computer 200 may rank expanded targets 221-224 by their relevance scores to achieve a relative ordering from potentially most relevant to potentially least relevant, shown as ranking 260. To obtain relevance scores for pairings of content item 250 with each of expanded targets 221-224, computer 200 invokes artificial neural network 240.

Artificial neural network 240 generates a relevance score based on stimulus inputs such as 281-282. Inputs 281-282 may encompass a wide range of data that is associated with a content item, an expanded target, or circumstantial data that is contextual or sessional. For example, an input may involve text or semantics extracted from content item 250. An input may involve a characteristic of a particular expanded target. For example, input 281 may be a characteristic of target 221 when generating relevance score 231, but may instead be a same characteristic of target 222 when generating relevance score 232. An input may be circumstantial, such as season or time of day.

The first phase, training, need not occur in a transactional production environment. For example, training may be a scheduled bulk process that occurs in an offline computational environment such as a laboratory computer cluster. Thus, computer 200 may use artificial neural network 200 to rank targets as potential matches for content items.

Although the second phase, ranking, detects potential matches based on relevance scores 231-234, those matches need not be finalized during that phase. Instead, computer 200 may durably store those matches as proposals for future reference. For example, computer 200 may store each match as a row in a database table with columns that identify the content item, expanded target, and relevance score for the match. For example as shown, all of expanded targets 221-224 are potential matches for content item 250. Thus, computer 200 may store a table row for each pairing of targets 221-224 with content item 250. Furthermore, the ranking phase may be repeated for other content items. For example, computer 200 may rerun expansion techniques 211-212 for each content item to identify the same or different expanded targets for scoring and ranking.

Ranking entails sorting expanded targets based on relevance score. For example, computer 200 may sort expanded targets 221-224 according to relevance scores 231-234 to generate ranking 260, which is a relative ordering of expanded targets 221-224. Computer 200 lazily scores expanded targets when it encounters them for a given content item. Because there may be more expanded targets in ranking 260 than may actually be needed in the future, computer 200 may limit persisting of matches to a best few (highest scoring) expanded targets of ranking 260. For example, computer 200 may choose selected subset 270 as targets that score highest with content item 250 and persist only associations for selected subset 270. In embodiments, selected subset 270 contains a fixed number of expanded targets. In embodiments, selected subset 270 contains a variable number of expanded targets whose relevance scores exceed a threshold.

The matches within ranking 260 are mere proposals that may or may not ever actually be executed. For example, ranking 260 may identify targets for which content item 250 is potentially suited. Actually providing a content item to a target may occur in the future in a live transactional production environment during a third phase for presentation. The presentation phase may consume data that the ranking phase produces, just as the ranking phase consumes data that the training phase produces, such as interconnection weights between neurons of artificial neural network 240. Thus, techniques herein may entail some or all phases for training, ranking, and/or presentation. Furthermore, a different computer may be dedicated to perform each phase. The presentation phase may need a live (transactional production) environment. Whereas, training and ranking do not need to be live. Furthermore, training and ranking may entail batch processing that is scheduled with different frequencies. For example, training may occur weekly. Whereas, ranking may occur nightly.

Formatting for Efficient Retrieval

Figure 3:
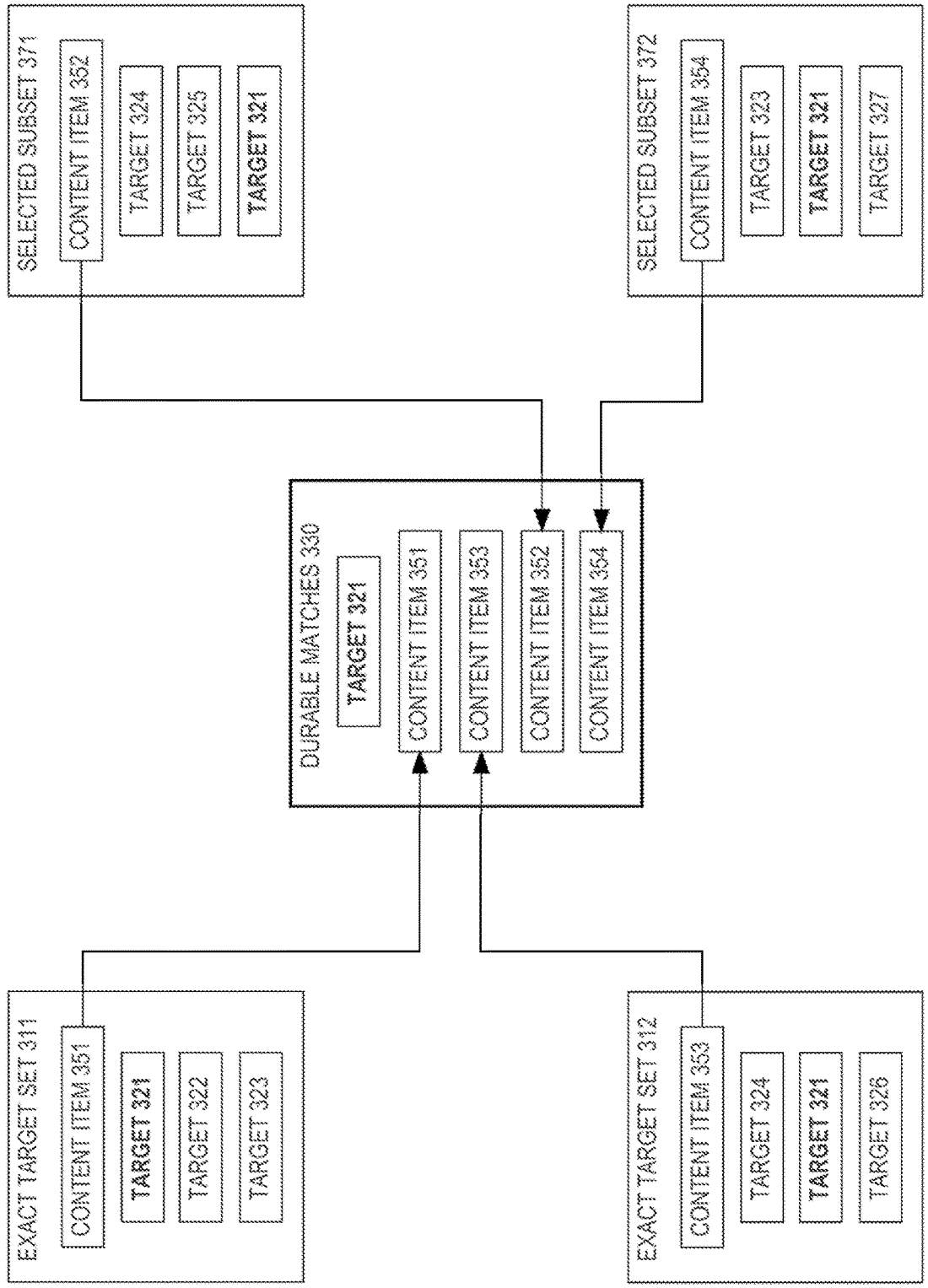
FIG. 3 is a block diagram of a computer that reorganizes proposed matches to facilitate retrieval on demand, in which various embodiments may be practiced.

FIG. 3 is block diagram of a computer 300 in which various embodiments may be practiced. Computer 300 reorganizes proposed matches to facilitate retrieval on demand. Computer 300 may be an implementation of computer 200.

During the presentation phase, a content item is actually provided to a target. In that phase, there may be a distinction between expanded targets and exact targets. An exact target may be matched to a content item based on high-priority criteria that may be express, discrete (not statistical), and/or contractually sponsored. Different instances or sets of such criteria may be respectively associated with different content items. Thus, when a particular target is available to receive content in a live environment, a production computer (not shown) may apply the criteria of many content items to the particular target to identify a subset of content items whose targeting criteria are exactly satisfied by the particular target. From that subset of satisfactory content items, the production computer may select a particular content item to serve to the particular target. However, such targeting criteria may be narrow (especially if sponsored), and the particular target might not exactly match any content items. The techniques herein may function as a fallback to provide additional proposed matches for use when no exact match is possible or to use as a possibly higher value match when exact matches have low value. For example, an exact match may sometimes have a lower relevance score or a lower monetization reward.

Although FIG. 2 shows only one selected subset 270 for one content item 250, in practice, computers 300 and 200 may generate one selected subset for each of many content items. For example, computer 300 respectively generates selected subsets 371-372 for content items 352 and 354.

As explained, during the presentation phase, a computing device of a particular target awaits selection and presentation of an unspecified content item. That scenario has implications for the data structures that computer 300 persists during the ranking phase, because those data structures may be tailored to suit the presentation phase that consumes them. For example, selected subsets 371-372 might not be directly useful in the presentation phase because the particular waiting target may be contained in hundreds or thousands of selected subsets, each for a different content item. Instead, the presentation phase may naturally need a data structure that proposes multiple relevant content items for a given target. Whereas, each of selected subsets 371-372 proposes multiple suitable targets for a given content item. Thus, computer 300 may finish the ranking phase by persisting an association of a set of relevant content items for each expanded target, such as durable matches 330 for target 321. For example, computer 300 may generate many selected subsets 371-372 (one for each content item) as transient (e.g. stored in volatile memory) intermediate results and then eagerly filter the intermediate results on a per-target basis to generate and persist an association of a set of relevant content items for each expanded target, such as durable matches 330 for target 321.

Alternatively, computer 300 may persist the intermediate results (selected subsets 371-372), and later those results may be lazily filtered for a particular target on demand during the presentation phase. Either way, the presentation phase ultimately obtains, for an individual target, a set of relevant content items that the presentation phase may then sort, rank, or otherwise compare to identify a momentarily most relevant content item for the actually waiting target, such as durable matches 330 for target 321. For example, final selection of one content item from durable matches 330 for actual presentation may be partially based on contextual or sessional attributes, such as the size of the target's display screen or a current time of day.

Computer 300 creates a durable matches, such as 330, for each of some or all known targets, such as 321. To populate durable matches 330, computer 300 may identify exact target sets 311-312 that contain a given target, such as 321. Each of exact target sets 311-312 contain targets whose attributes and characteristics exactly match the targeting criteria of a respective content item. For example as explained above, each of content items 351 and 353 may respectively have targeting criteria that some targets may satisfy. A content item is likely to be highly relevant to targets in its associated exact target set, and thus those targets do not need to be ranked. Whereas, computer 300 ranks for inclusion within selected subsets 371-372 only expanded targets for which a given content item is potentially relevant. For a given target, such as 321, computer 300 identifies exact target sets that contain target 321, such as exact target sets 311-312. Exact target sets 311-312 are for respective content items 351 and 353. Computer 300 inserts content items 351 and 353 into durable matches 330.

For example, a relational database may have an associative table for exact target sets, another associative table for durable matches, and yet another associative table for selected subsets. Those associative tables (which may or may not be the same table) may have foreign key columns that store identifiers of content items and targets. Each row of those associative tables may encode a pairing of a content item and a target. For example, content item 351 may be stored in a row of a content item table. Target 321 may be stored in a row of a target table. An association between content item 351 and target 321 may be stored as a row in one associative table to indicate that target 321 belongs in exact target set 311, selected subset 371, and/or durable matches 330.

However, target 321 may be an exact target of too few content items. For example, computer 300 may be expected to generate durable matches, such as 330, that contain at least a threshold amount of content items. For example, durable matches 330 should contain at least four content items for target 321, but target 321 appears in only two exact target sets. Thus, computer 300 may identify selected subsets that target 321 also appears in, such as 371-372. Thus, computer 300 may detect that target 321 is an expanded target for content items 352 and 354 of selected subsets 371-372. Computer 300 may add content items 352 and 354 to durable matches 330 to ensure that durable matches 330 has at least four content items. Computer 300 may persist durable matches 330 for later retrieval in a live transactional production environment that actually needs to match content items to targets in real time (or at least identify and, optionally rank, pre-selected content items for targets in real-time).

Ranking Based on Relevance Scores

Figure 4:
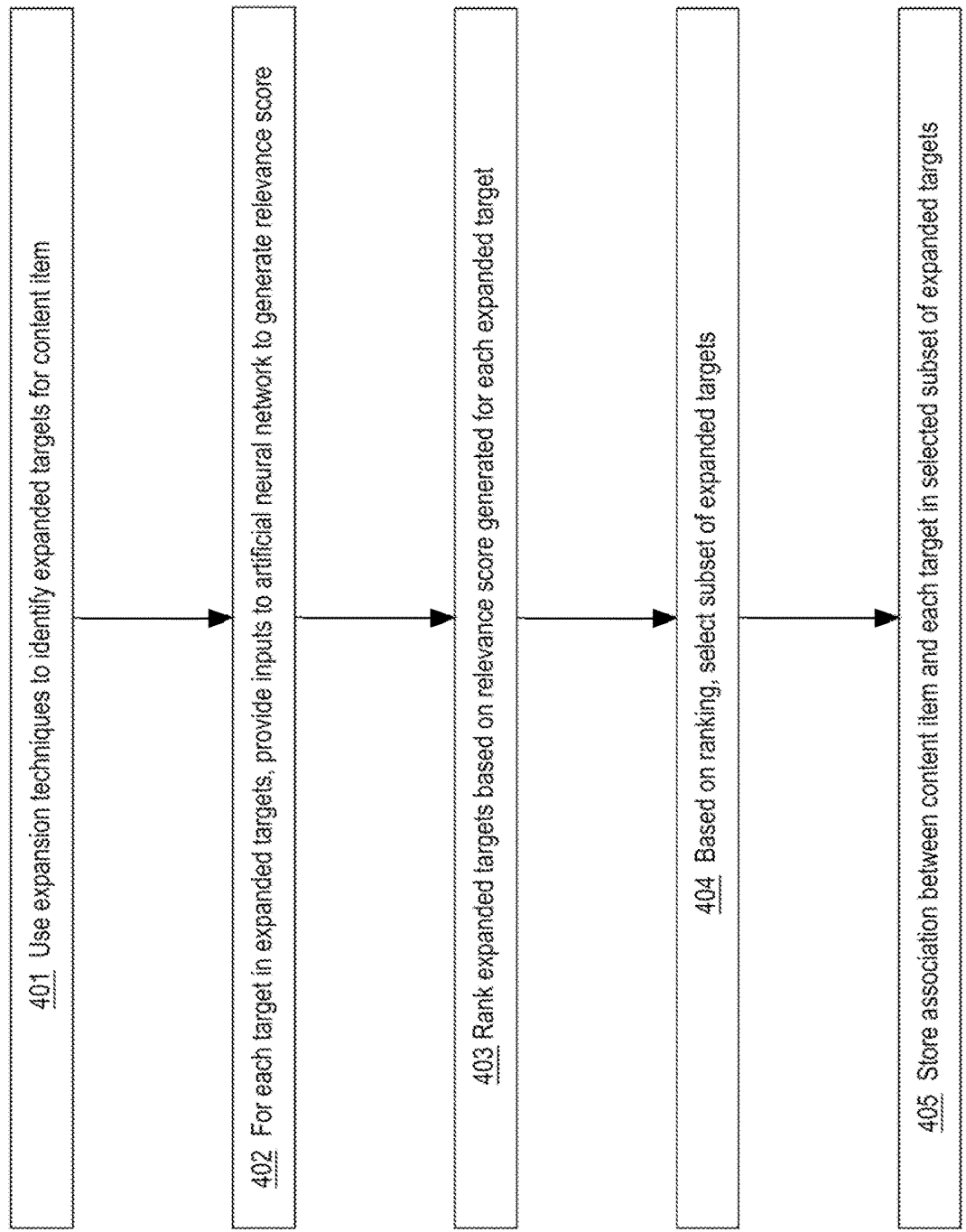
FIG. 4 is a flow chart of a method that uses an artificial neural network to score the relevance of content items for a target and ranks the content items based on their scores, according to various embodiments.

FIG. 4 is a flow chart of a method that uses an artificial neural network to score the relevance of content items for a target and ranks the content items based on their scores, according to various embodiments. The method can be performed by computer 200 or 300 and is discussed with reference to FIGS. 2-3. The method occurs during an expansion and ranking phase that need not occur in a live (transactional production) environment. The method works with expanded targets. Exact target may have already been identified with other computerized techniques.

In step 401, a computer uses one or more expansion techniques to identify expanded targets for a given content item. For example, computer 200 may execute the logic of expansion techniques 211-212 to identify expanded targets such as 221-224 for which content item 250 might be relevant. Expansion techniques 211-212 may refer to exact targets as exemplars. For example, computer 300 may use attributes or characteristics of exact target 321 (and zero or more other targets) as filtration conditions with which to identify expanded targets that are similar to exact target 321. Thus, step 401 may yield an expansion set of expanded targets. However, the relevance of the given content item to the expanded targets may be mixed. Thus, the method includes subsequent ranking steps to assure relevance.

In step 402, the computer provides inputs to an artificial neural network to generate a relevance score for each expanded target that indicates the suitability of the given content item. For example, computer 200 may provide data about content item 250 and expanded target 221 as stimulus inputs, such as 281-282, to artificial neural network 240 to generate relevance score 231. Computer 200 may use artificial neural network 240 to likewise generate relevance scores 232-234 for other respective expanded targets 222-224.

In step 403, the computer ranks the expanded targets based on their relevance scores. For example, computer 200 may sort expanded targets 221-224 by their relevance scores to achieve a relative ordering from potentially most relevant to potentially least relevant, shown as ranking 260.

In step 404 and based on the ranking that occurred in step 403, the computer selects the most relevant subset of the expanded targets. For example, computer 200 may identify expanded targets 221-222 as the most relevant expanded targets and stores them into selected subset 270. Thus, selected subsets such as 371-372 may contain expanded targets that are potentially as relevant or nearly as relevant as the exact targets of exact target sets 311-312. For example, computer 200 may include a fixed amount of expanded targets of ranking 260 within selected subset 270.

In step 405, the computer stores associations between the given content item and each target of the selected subset of expanded targets. For example, computer 200 may associate content item 250 with selected subset 270. Alternatively, computer 200 may associate content item 250 with each individual expanded target of 221-222. In embodiments, computer 300 durably stores the association(s) in a file or database. In embodiments, computer 300 transiently stores the association(s) in volatile memory. In embodiments, computer 300 does not persist selected subsets 371-372 but does persist durable matches 330. In embodiments, computer 300 persists selected subsets 371-372 and durable matches 330.

Figure 5:
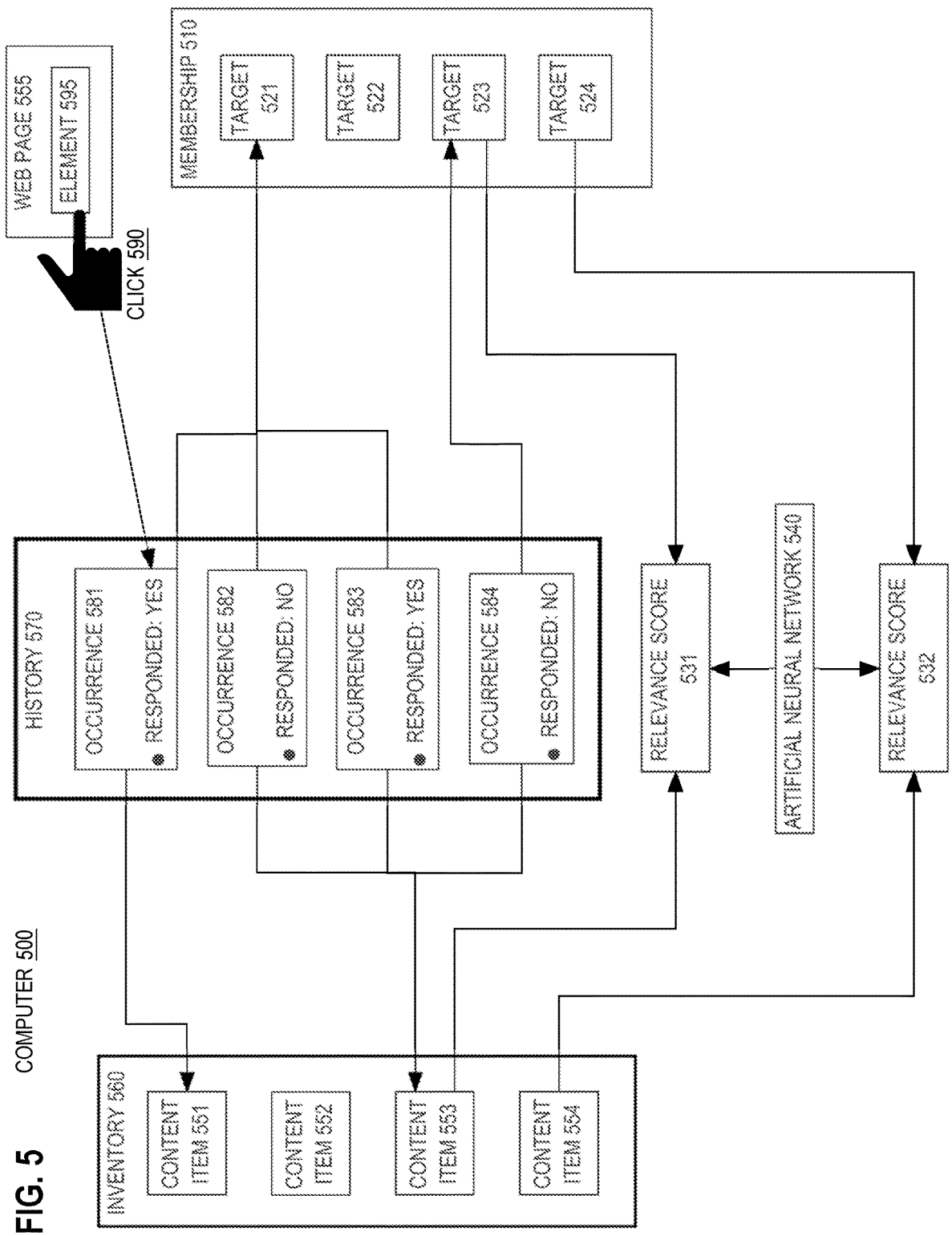
FIG. 5 is a block diagram of a computer that uses historical matches to train an artificial neural network for relevance scoring, in which various embodiments may be practiced.

History-Based Training of an Artificial Neural Network that Calculates Relevance Scores FIG. 5 is block diagram of a computer 500 in which various embodiments may be practiced. Computer 500 uses historical matches to train artificial neural network 540 for relevance scoring. Artificial neural network 540 may be an implementation of artificial neural network 240. For example, artificial neural network 240 is shown in the ranking phase. Whereas, artificial neural network 540 is shown in the training phase. Because training may be an offline (i.e. not live) activity, computer 500 need not be a transactional production server.

The components shown for computer 500 may be encoded as logic or data structures in the memory or other storage of computer 500. Computer 500 maintains inventory 560 of content items such as 551-554. For example, content items 551-554 may be reusable resources such as documents stored as files in file system.

Over time, various content items of inventory 560 may be presented to various targets within membership 510, such as targets 521-524. Thus, presentation history 570 may accumulate and be recorded. History 570 records which content items of inventory 560 were actually provided to which targets of membership 510. Each time a content item is provided to a target, a new occurrence is added to history 570, such as occurrences 581-584. For example, occurrences 581-584 may each be durably stored as a row in a history table. Each row may identify a content item, a target, and has a flag that indicates whether or not the target responded to the content item during the occurrence.

For example, a content item may be presented as (or within) an element of a webpage. For example, as shown, content item 551 may be presented, to target 521, as element 595 within webpage 555, which presentation may be recorded within history 570 as occurrence 581. Target 521 may respond to content item 551, such as by hovering a mouse pointer over element 595 or by touching element 595 with a touchpad, shown as click 590. That target 521 did or did not respond to content item 551 is recorded in occurrence 581. Thus, history 570 may have a more or less complete history of which content items were provided to which targets, and which targets responded to which content items.

A content item may be provided to more than one target. For example, content item 553 was provided to targets 521 and 523 as recorded by occurrences 582-584. A particular content item need not ever be provided. For example, content item 552 was not provided to any target. A content item may be repeatedly provided to a same target. For example according to occurrences 582-583, content item 553 was presented to target 521 twice. Occurrence 582 indicates that a first time that content item 553 was provided to target 521, and that target 521 did not respond. Whereas, occurrence 583 indicates that content item 553 was provided to target 521 a second time, and that target 521 responded (e.g. clicked). A target may eventually be shown many content items. For example, target 521 was shown content items 551 and 553. A particular target need not ever be provided any content items. For example, target 522 was not provided any content items.

It is important to distinguish history 570 from the matches made for ranking 260 on FIG. 2. The matches within ranking 260 are mere proposals that may or may not ever actually be executed. Whereas, occurrences 581-584 actually occurred during an earlier phase for presentation.

Computer 500 uses history 570 to train artificial neural network 540 to emit a relevance score for a given content item and a given target. As explained for FIG. 2 but not shown in FIG. 5, the artificial neural network takes input stimulus data that is gleaned from the content item and the target. Furthermore, artificial neural network 540 is iteratively (incrementally) trained, such that a given occurrence (of 581-584) is used to determine input data for an iteration. That is, each iteration involves a different occurrence. For example, because occurrence 581 matched content item 551 to target 521, attributes of content item 551 and target 521 may be fed as input into artificial neural network 540 during the iteration that uses occurrence 581.

Furthermore, artificial neural network 540 may be an individual (e.g. dedicated or personalized) neural network for a particular target or a shared (e.g. global) neural network for many or all targets. A global neural network may be trained by iteratively stimulating it with all occurrences 581-584 of history 570 to achieve neuronal interconnection weights that are generally useful for arbitrary targets and thus reusable for many targets.

A dedicated neural network may be trained by iteratively stimulating it with only those occurrences of history 570 that involved a given target. For example, a neural network that is dedicated to target 521 may be iteratively trained with occurrences 581-583, but not occurrence 584, which is for a different target. A dedicated neural network may be initially cloned from a global neural network and then individually trained to achieve customization. For example, the neuronal interconnection weight values of a global neural network may be used as the initial weight values (i.e. a starting point) from which a dedicated neural network may then be trained. Thus, dedication may effectively entail cloning and retraining of an existing neural network. For example, a new target may join membership 510, such that history 570 has no occurrences for that new target for training a dedicated neural network. The presentation phase may use a global neural network or a more or less unaltered clone of the global neural network to generate relevance scores for the new target. Eventually occurrences will be added to history 570 for the new target that may be used to train a dedicated neural network for the new target. To reduce training time or increase temporal relevance, history 560 may be limited to content items that do not exceed a given age threshold. In embodiments, training a global neural network may be limited to using only very recent (e.g. weekly) history. In contrast, training a dedicated neural network may use older history, such as monthly, yearly, or unlimited.

During iterative training based on occurrences from history 570, adjustments are made to the neuronal interconnection weights of artificial neural network 540 to improve the accuracy of relevance scores that artificial neural network 540 emits. For example, a training iteration may involve feeding data for one occurrence into artificial neural network 540 to emit a proposed relevance score, such as 531-532, for a given content item and target of the occurrence. The relevance score may be normalized according to a scale extending from zero (irrelevant) to one (perfect match). The proposed relevance score that artificial neural network 540 emits during training for an occurrence may be compared to an indication of whether the given target ever (during this occurrence or any other occurrence) responded to the given content item. For example, target 521 eventually responded to content item 553 after repeated presentations. Thus, artificial neural network 540 should emit a normalized relevance score that approaches one when occurrence 582 or 583 is used as a training stimulus. Whereas, target 523 was presented content item 553 but never responded. Thus, artificial neural network 540 should emit a normalized relevance score that approaches zero when occurrence 584 is used as a training stimulus. During training, artificial neural network 540 may emit a proposed relevance score that more or less deviates from the expected one or zero that history 570 suggests. Thus, the weights may need adjusting to better more closely approximate the expected relevance score. For example, a neuron internal to artificial neural network 540 that wrongly indicates relevance for an irrelevant content item may be adjusted by decreasing the weight of its connection to other neuron(s). That process of decreasing or increasing weights can amplify or inhibit neurons to achieve behavioral reinforcement that is essential to training.

An architecture of an artificial neural network is described later herein. Also described later herein are mathematics describing the operation of the artificial neural network to calculate a relevance score. Training typically involves an error function to measure how accurate are the relevance scores generated by artificial neural network 540 after receiving training input stimulus. For example, error for a particular relevance score may be the square of the arithmetic difference between a historic occurrence that is polarized as one or zero for a relevance score based on actual response and a relevance score actually generated during training. Thus, actual and expected relevance scores are compared to measure error. Connection weights may be initially chosen at random. Gradient descent based on partial derivatives of measured error may be used to adjust/tune the weights during training, such as with backpropagation. Forward propagation entails activation of neural network 540 by injection of the content and target features as input stimulus and generation of a resulting relevance score based on that input. Backward propagation entails an error measurement for each connection between two neurons, based on measuring error as explained above. Connection weights are adjusted according to the amount of error for each connection. Thus, training entails a sequence of three phases (forward propagation, backward propagation, and weight adjustment), and that sequence may be iteratively repeated. For example, after weight adjustment, forward propagation may again occur with same or different historic occurrences as stimulus input. Formulas and data structures for encoding connection weights for use during neural network activation are discussed later herein.

Preferential Ranking

Figure 6:
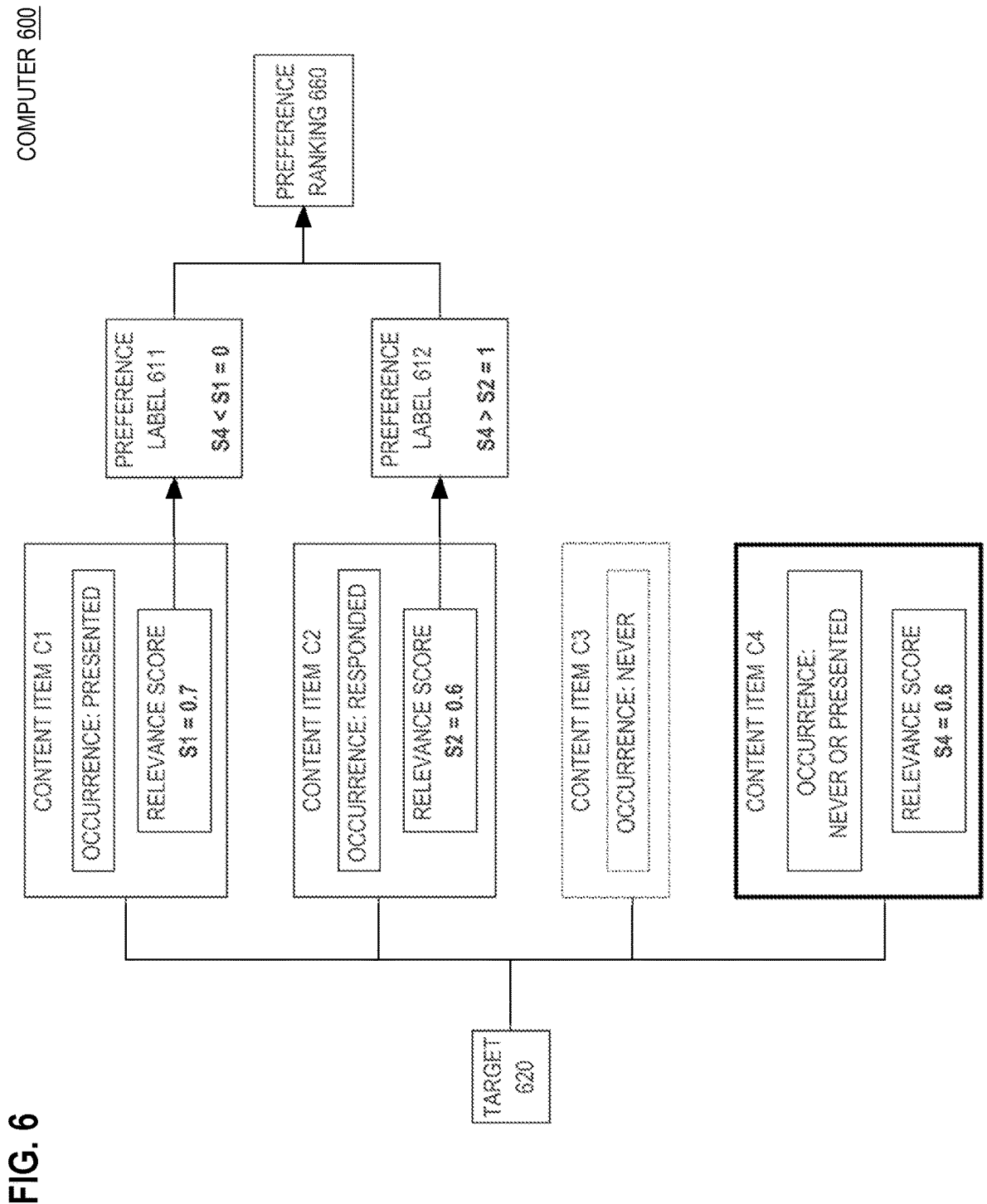
FIG. 6 is a block diagram of a computer that ranks expanded targets based on each target's differential preferences between content items, in which various embodiments may be practiced.

FIG. 6 is block diagram of a computer 600 in which various embodiments may be practiced. Computer 600 ranks expanded targets based on each target's differential preferences between content items. Computer 600 may be an implementation of computer 200.

Relevance scoring is based on historical training and/or dedicated neural networks. However by themselves, those are not necessarily a perfect solution for target ranking, because they may be prone to distortions caused by target outliers. For example, the dedicated neural network of an impulsive target that responds to many content items may tend to emit high relevance scores for most content items. If expanded target ranking is based solely on raw relevance scores, as suggested for FIG. 2, then the impulsive target may tend to dominate the rankings for many content items.

That natural consequence might naively seem advantageous for maximizing aggregate future responses across all targets. However in practice, the opposite (reduced responses) may actually occur. That is because the impulsive target would qualify for many selected subsets 270 (FIG. 2) to the exclusion of less impulsive targets. That is, less impulsive targets would qualify for fewer or no selected subsets 270. A less impulsive target that does not qualify for enough selected subsets 270 may be problematic because ultimately a list of relevant content items may be needed for that target. Thus, a less impulsive target that qualifies for no selected subsets 270 will not have any content items durably associated as potentially relevant. Computer 600 may improve upon computer 200 as follows.

Computer 600 provides a mechanism to limit the inclusion of more impulsive targets into selected subsets 270. That mechanism also boosts the inclusion of less impulsive targets into selected subsets 270. Ultimately, that mechanism may boost aggregate future responses across all targets because every target will be durably associated with ample potentially relevant content items.

That mechanism is based on calculating relevance scores of content items already historically provided to a given expanded target and comparing those scores to the relevance score of the current content item for the given expanded target. Those comparisons are performed for all of the expanded targets of the current content item. The results of all such comparisons are used to rank the expanded targets of the current content item. Thus, target 620 qualifies for selected subset 270 based not on having a higher relevance score than other expanded targets, but instead based on having a higher relevance score for the current content item than for other content items that were previously provided to target 620. Thus, inclusion in selected subset 270 is based on preference rather than relevance. Use of derived preference rather than raw relevance exploits the fact that all targets, regardless of impulsivity, may have differential preferences between content items. Preference ranking occurs as follows.

Computer 600 has an inventory of content items such as C1-C4. Target 620 has a history of exposure to the inventory, which is shown in each content item as "occurrence". For example, target 620 was shown content items C1-C2 but only responded to C1. Preference ranking is only interested in comparing the current content item (C4) to content items already presented to target 620, and especially content items that target 620 actually responded to. Thus, content item C3 is irrelevant to preference scoring for current content item C4 because C3 was never provided to target 620. Thus preference labels 611-612 are calculated only for content items C1-C2 which were actually provided to target 620. Thus, computer 600 need only calculate relevance scores S1-S2 and S4 respectively for historic content items C1-C2 and current content item C4 but not C3.

A relevance score may be calculated regardless $_{[b1]}$ of whether a content item does or does not have presentation history and regardless of whether a content item was or was not actually responded to. For example, although content item C1 was actually responded to, and C2 was not responded to, a synthetic relevance score S1-S2 may be calculated by a neural network for each of C1-C2. Furthermore, relevance scores S1-S2 need not accurately corroborate empirically observed history. For example, S2 is less than one, even though C2 was actually responded to. Likewise, S1 is greater than zero, even though C1 was not responded to. Relevance scores S1-S2 are significant because they provide useful reference points for comparing the relevance scores of other content items, such as C3-C4, that might never have been presented. Such comparisons are important for detecting relative preferences between content items for target 620. For example, even though content item C2 was actually responded to, there is no utility in assigning C2 a relevance score of one, because that implies that C2 is target 620's favorite content item of all possible content items, including content items that were never presented to target 620. Likewise, a relevance score of zero for content item C1 implies that C1 is target 620's least favorite of all presented and unpresented content items. Such implied extremes (most favorite, least favorite) are unlikely to be accurate. Furthermore, such polarized relevance scores would force comparison results that do not offer useful guidance. For example, if S2 were polarized as having a value of one, then all content items not yet presented to target 620 would be comparatively less suitable, regardless of what their relevance scores were.

Whereas, a relative preference may meaningfully be polarized as either one or zero, because preference is naturally a binary phenomenon, even though relevance naturally has a continuous (non-binary) scale. A preference label may be a Boolean flag (one or zero) that indicates whether or not target 620 prefers the current content item (C4) over the given historic content item (C1 or C2). For example, relevance score S4 is greater than S2. Thus, preference label 612 is assigned a value of one. Conversely, preference label 611 has a value of zero because S4 is less than S1. Based on preference labels 611-612, computer 600 may detect the presence or absence of a relative preference by target 620 for current content item C4 over historic content items. Preference ranking 660 may then sort the expanded targets (not shown) based on their preferences for current content item C4. Thus, a less impulsive target may be ranked above a more impulsive target, even though the more impulsive target has a higher relevance score for content item C4. Thus, less impulsive targets may be eligible for inclusion in selected subset 270 despite their lower relevance scores. Thus, computer 600 ensures that most or all expanded targets are durably associated with at least some content items.

If an expanded target lacks history, then the history of one or more characteristically similar targets may be used as a proxy. Thus, computer 600 can perform preference ranking even for new targets. Furthermore, preference ranking works well even though different expanded targets may have disjoint histories that have no content items in common.

Implementation of preference ranking 660 depends on the embodiment. For example, the labels of preference labels 611-612 may be summed or averaged to achieve an overall preference upon which preference ranking may be based. Thus, a first expanded target that prefers current content item C4 over more historic content items may be ranked higher than a second expanded target that prefers C4 over fewer historic content items.

Preference labels may be weighted according to the nature of the history. For example, first and second expanded targets may each prefer C4 over one historic content item (not necessarily a same one). However, if the first expanded target actually responded to its historic content item and the second expanded target did not, then the first expanded target would rank higher.

Extracted Features as Stimulus Input to Artificial Neural Network

Figure 7:
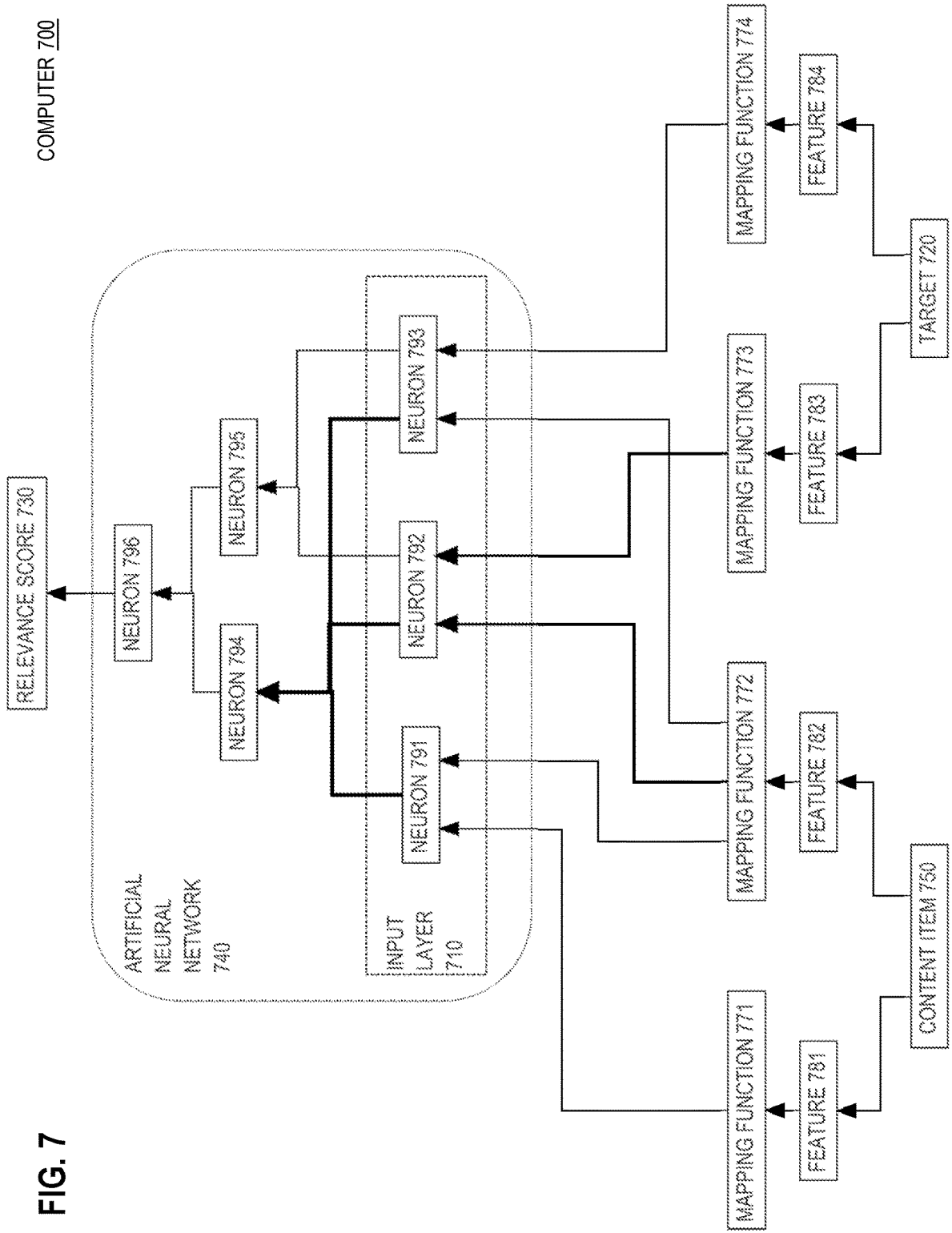
FIG. 7 is a block diagram of a computer that uses an artificial neural network to calculate a relevance score based on features, in which various embodiments may be practiced.

FIG. 7 is block diagram of a computer 700 in which various embodiments may be practiced. Computer 700 uses artificial neural network 740 to calculate a relevance score based on features. Artificial neural network 740 may be an implementation of artificial neural network 240.

As explained above, the relevance of a content item to a target may depend on various aspects such as attributes or characteristics of the content item and target. For example, computer 700 may extract features 781-782 from content item 750 and features 783-784 from target 720. Content features such as 781-782 may be various aspects of content item 750 such as (1) content data, such as content text, pixels, or semantic content, or (2) item metadata, such as the identity or aspects of the owner of content item 750. Target features may be various aspects of target 720 such as requirements, demographics, topic of interest, Internet navigation history or other activity history, social graph connection data, or online profile.

Artificial neural network 740 may consume features 781-784 as stimulus input. Artificial neural network 740 is composed of neurons such as 791-796 that are arranged into different layers, such as input layer 710. Each feature may be used as input for one or more neurons of input layer 710. Likewise, each neuron of input layer 710 consumes at least one feature. In embodiments (not shown), each feature is consumed by exactly one respective neuron, and the input neurons each consume exactly one respective feature.

A feature may have an arbitrary discrete or continuous value that may be multidimensional. Whereas, input neurons 791-793 expect to consume a numeric scalar value (i.e. a number). Thus, some or all of features 781-784 may need a respective mapping function, such as 771-774, to convert and normalize the data of the feature into a consumable number. For example, feature 781 may be a string of textual words that mapping function 771 may convert into a count of aspirational words to feed into neuron 791. An image feature may be decomposed into portions or even individual pixels whose values may independently be applied to a respective or shared mapping function.

Neurons 794-795 form an intermediate abstraction layer to synthesize and detect high level aspects from multiple low level aspects detected by individual input neurons. Each layer may have many neurons, although a higher layer may tend to have fewer neurons than a lower layer to achieve abstraction. At the highest layer is one or a few neurons, such as 796, that perform final integration of intermediate results to generate relevance score 730 that artificial neural network 740 emits.

The operation of artificial neural network 740 depends on the operation of the connections between neurons. Connections are directed, originate at an immediately lower layer, and terminate at an immediately higher layer. Thus, connections do not skip over layers and do not connect neurons of a same layer.

Each neuron integrates (e.g. sums) the values conveyed to it by the connections from the previous layer (or mapping functions). The neuron then sends the integrated value over connections to neurons in the next layer. Neurons are integrative. Whereas, connections perform adjustments. A connection receives a value from one neuron, scales that value according to the weight of the connection, and the forwards the weighted value to a neuron in the next layer. Training entails adjusting the connection weights to tune the predictive/perceptive behavior of artificial neural network 740 as an entire assembly of neurons and connections.

During actual scoring (e.g. during ranking) after training is finished, the connection weights are immutable. Thus, for ranking, artificial neural network is not encoded as discrete neurons and connections (as during training), but instead is encoded as a two-dimensional matrix of weights. Likewise, the output of mapping functions 771-774 may be encoded as an input vector (i.e. one dimensional matrix). Thus, during ranking, the operation of artificial neural network 740 may be achieved by multiplication of both matrices, which is computationally efficient. Furthermore, matrix multiplication is well suited to single instruction multiple data (SIMD) execution or symmetric multiprocessing (SMP) such as with multicore. For example, computer 700 may have commodity graphical processing units (GPUs) that are repurposed to perform the matrix operations of artificial neural network 740. Thus, artificial neural network 740 is amenable to commodity hardware acceleration.

Furthermore, the input vector may be logically split into two partial vectors, with one for content item 750 and the other for target 720, which can be reused (recombined) with different partial vectors to achieve various input pairings for other content items and targets, as may occur with relevance ranking and preference ranking. Furthermore, content item 750 may be immutable, and target 720 may be almost immutable (seldom changes), such that their partial input vectors may be persisted with a high likelihood of remaining valid for future reuse. Furthermore, because artificial neural network 740 may be dedicated (not global) to target 720, the partial input vector for target 720 may be interned (more or less permanently mathematically integrated) within the weight matrix of artificial neural network 740. Thus, repeated use of artificial neural network 740 need not be computationally expensive. In other words, the score intensive nature of ranking should scale well, despite huge amounts of targets and content items.

Some of the operation of computer 700 may be reduced to mathematical formulae. For example, content feature 781 may be transformed by mapping function 771 to yield a normalized feature coefficient, such as with the following example formula.

$$\text{coefficient}_1 = \text{function}_{771}(\text{feature}_{781})$$

Feature coefficient$_1$ may be a naturally normalized value because mapping function 771 may comprise a logistic function, such as a sigmoid function. For example, content feature 781 may comprise pixels of an image. Mapping feature 771 may calculate a pixel luminance variance V for the image as a positive number.

Feature coefficients for content features 781-782 may be aggregated into a coefficient vector, such as with the following example formula.

$$\text{vector}_{content} = (\text{coefficient}_1, \text{coefficient}_2)$$

The coefficient vectors for content features and target features may be aggregated into an input matrix, such as with the following example formula.

$$X_{content,target} = (\text{vector}_{content}, \text{vector}_{target})$$

Thus $X_{content,target}$ may be a two dimensional matrix that encodes all of the features of a given content item and a given target as stimulus inputs for injection into artificial neural network 740 as determined by the outputs of mapping functions 771-774. Feature matrix X may be used during training or during scoring.

Each input neuron 791-793 may consume the elements of feature matrix X. Each input neuron 791-793 may weight the input features differently. Thus, each input neuron 791-793 has its own weight vector, such as $W_{791}$. Thus, the value of input neuron 791 may be calculated, such as with the following example matrix multiplication formula.

$N_{791}$=function($W_{791}^T * X_{content,target}$), where $W^T$ is $W$ transposed The weight vectors of input neurons 791-793 may be aggregated as two-dimensional matrix $W_{710}$ for input layer 710, such as with the following example formula.

$W_{710}$=($W_{791}$, $W_{792}$, $W_{793}$)

Furthermore, the calculated values of input neurons 791-793 may be aggregated as vector $N_{710}$ for input layer 710, such as with the following example formula.

$N_{710}$=($N_{791}$, $N_{792}$, $N_{793}$)=function($W_{710}^T * X_{750,720}$)

The weight vectors of the multiple layers may be aggregated as a two-dimensional matrix $W_{target}$, which encodes all of the weights of artificial neural network 740, which is a dedicated neural network for target 720. Thus, computer 700 may calculate relevance score 730 for content item 750 and target 720, such as with the following example formula.

$S_{750,720}$=function$_{score}$($W_{720}^T * X_{750,720}$)

Furthermore, relevance score 730 may be a naturally normalized value because function$_{score}$ may comprise a logistic function, such as a sigmoid function. Thus, function$_{score}$ may emit relevance score 730 as a normalized value n($S_{content,target}$) with the following sigmoid function.

$n(S)=(1+e^{-S})^{-1}$, where $e$ is Euler's natural logarithm base

Thus, the calculation of any normalized relevance score for any content item and any target may be implemented by a same reusable function that takes a weight matrix and a feature matrix as arguments.

Contextual Relevance

Figure 8:
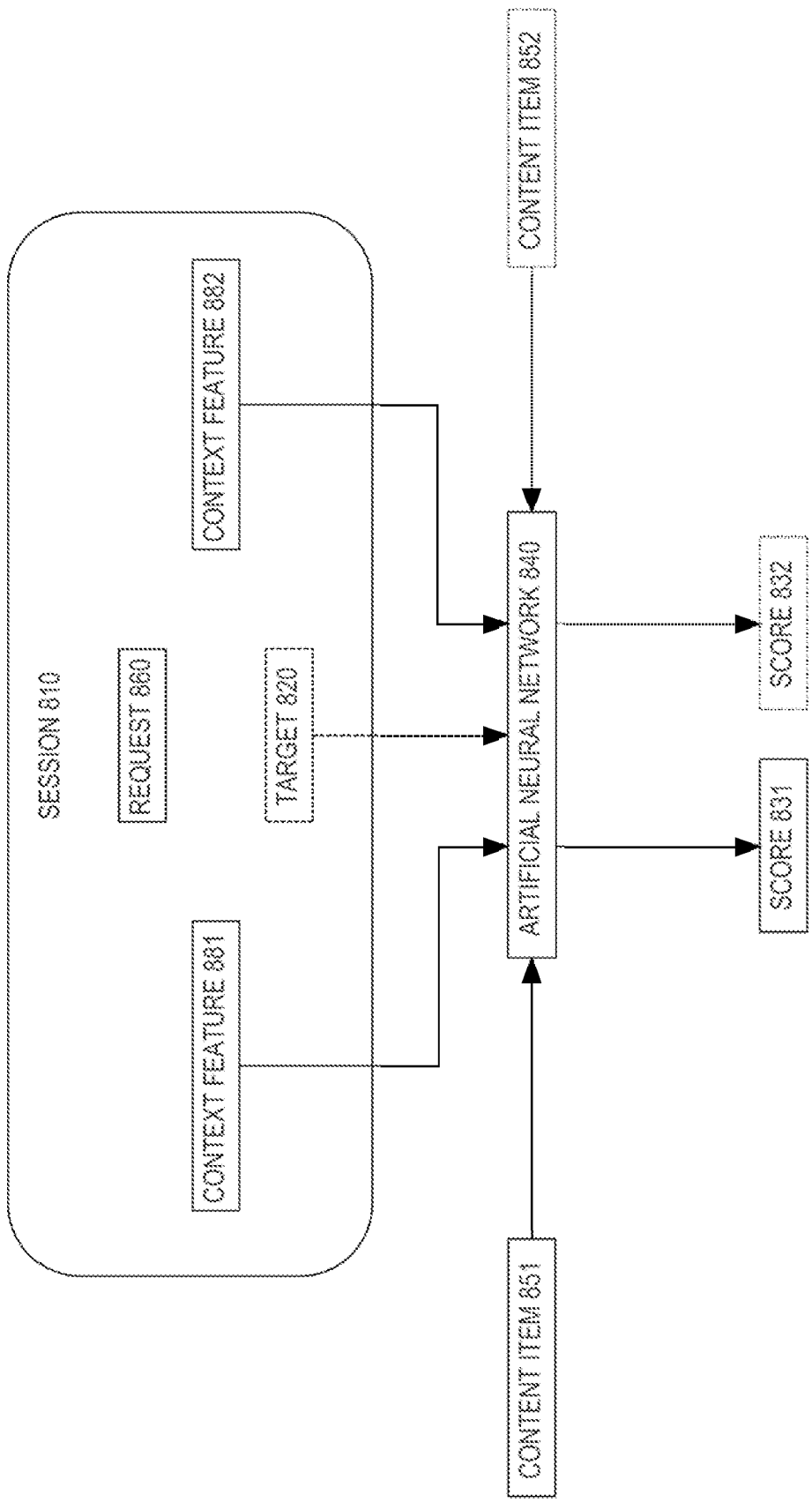
FIG. 8 is a block diagram of a computer that uses an artificial neural network to calculate a context sensitive relevance score, in which various embodiments may be practiced.

FIG. 8 is block diagram of a computer 800 in which various embodiments may be practiced. Computer 800 uses artificial neural network 840 to calculate a context sensitive relevance score. Artificial neural network 840 may be an implementation of artificial neural network 240. However, computer 800 may operate during a presentation phase that entails actually sending content items to targets. Thus, computer 800 may reside in a live transactional production environment.

The suitability of a content item for a target may be more or less circumstantial. Computer 800 may improve upon computer 200 that is not necessarily sensitive to contextual and/or sessional circumstance. A target may be associated with different computing devices on different occasions. However, some content items may be better suited for some devices than others. Thus, the inputs for artificial neural network 840 may include contextual data.

For example, target 820 may be provided various content items during various sessions of interaction with computer 800, such as session 810. Target 820 may receive content items in response to requests, such as 860, made during session 810. For example, target 820 may request a webpage that has dynamically supplied content, such as content item 851 and/or 852, whose suitability may be contextual.

Computer 800 may extract from session 810 and/or request 860 various context features, such as 881-882, that may be used as stimulus inputs into artificial neural network 840. For example, computer 800 may earlier have been trained based on context features of historical occurrences, in addition to features already described above.

Target 820 is drawn with dashed lines because it may or may not be used for stimulus input depending on whether or not internment has occurred as explained above when artificial neural network 840 is a dedicated neural network. If artificial neural network 840 is a global neural network, then target 820 may be expected to provide input for artificial neural network 840.

During the presentation phase, computer 800 may process request 860 by retrieving a set of durable matches of various content items to a given target, such as 321 (FIG. 3). Those content items were prepositioned as potentially relevant and may have been sorted (ranked) in an ordering that is or was a best attempt to indicate the relative relevance of the content items to the given target. For example, in durable matches 330, content items 351 and 353 are exact matches that rank above (as drawn) content items 352 and 354 because content items 351 and 353 are exact matches, and content items 352 and 354 are not.

Because some content items may be better suited for some devices than others or better suited for some circumstances, computer 800 has a final opportunity to reassess the relevance of preselected content items such as 851-852 based on sessional and contextual details. Computer 800 may invoke artificial neural network 840 with context features 881-882 and other inputs described herein to get updated relevance scores 831-832 for content items such as 851-852 for target 820 immediately before actually providing one of those content items. Computer 800 may recalculate relevance scores for exact matches, expanded matches, or both to achieve a more accurate and contextually sensitive final ranking.

In embodiments, computer 800 recalculates the relevance scores of all exact matches and/or expanded matches for target 820 in response to request 860. In embodiments, computer 800 re-ranks (reorders) exact matches and/or expanded matches whose scores were recalculated or reorders all exact and/or expanded matches regardless of which were recalculated. In embodiments, computer 800 recalculates one content item at a time for target 820, starting with the most relevant content item, and presents the first content item whose relevance score is not reduced by recalculation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
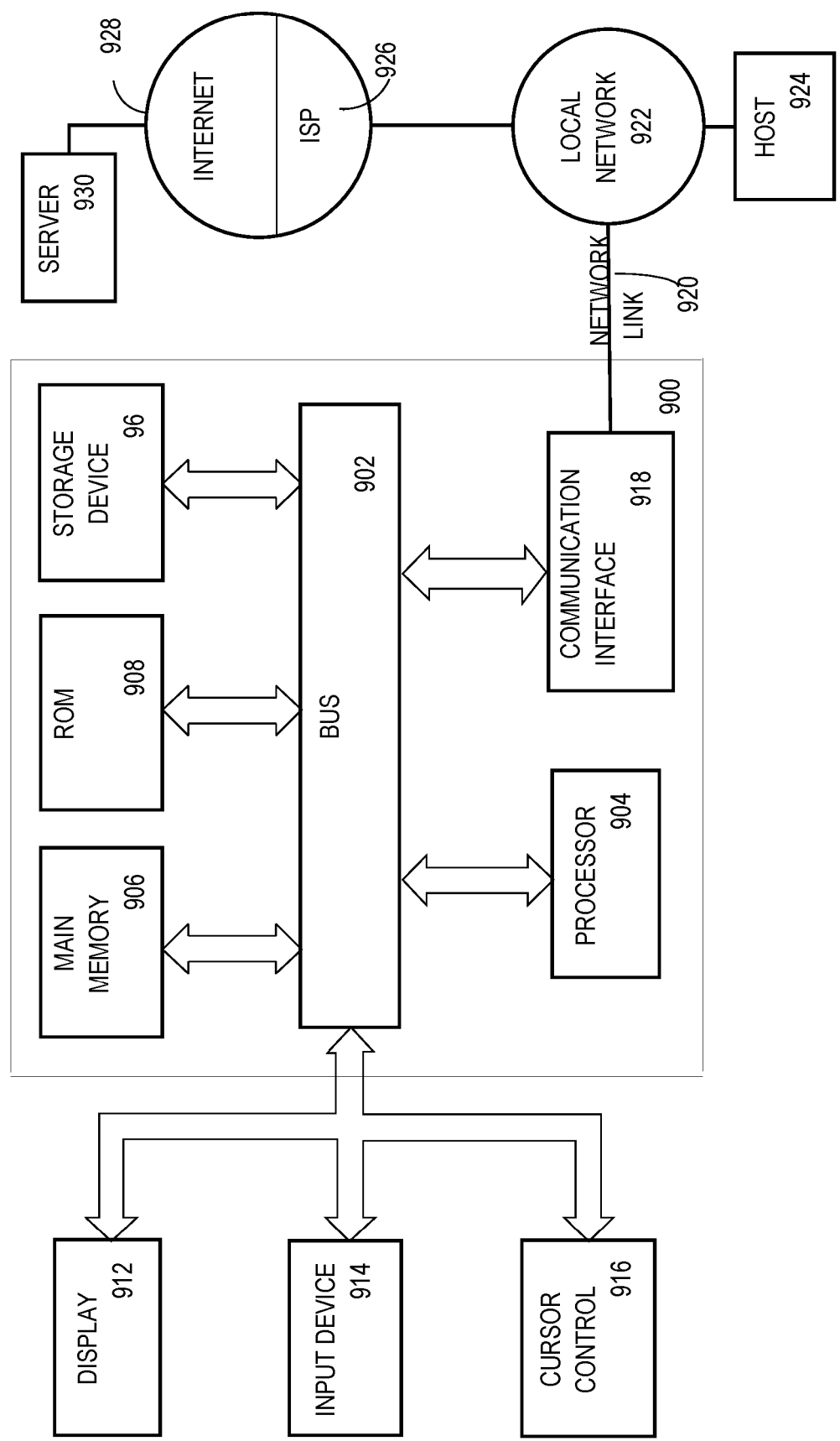
FIG. 9 is a block diagram that illustrates a computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
using a plurality of expansion techniques to identify an expanded plurality of targets that do not satisfy targeting criteria that are specified by a content delivery campaign for a first content item;
for each target in the expanded plurality of targets that do not satisfy said targeting criteria, providing a plurality of inputs to an artificial neural network to generate a relevance score that indicates a suitability of the first content item for said each target, wherein the plurality of inputs are based on the first content item and said each target;
generating a ranking of the expanded plurality of targets that do not satisfy said targeting criteria based on the relevance score generated for each target of the expanded plurality of targets that do not satisfy said targeting criteria;
selecting, based on the ranking, a subset of targets that do not satisfy said targeting criteria from the expanded plurality of targets that do not satisfy said targeting criteria;
storing an association between each target in the subset of targets that do not satisfy said targeting criteria with the first content item;
wherein the method is performed by one or more computers.

2. The method of claim 1 wherein based on the relevance score generated for each target of the expanded plurality of targets comprises based on the relevance score generated for each target of the expanded plurality of targets for the first content item exceeding the relevance scores generated for the target for one or more other content items that were previously provided to the target.

3. The method of claim 1 wherein:
the artificial neural network comprises a plurality of input neurons arranged in an input layer;
the method further comprises associating each feature of a plurality of features with at least one neuron of the plurality of input neurons;
the plurality of features comprises at least one of each of:
a target feature of a particular target, and
a content item feature of the first content item.

4. The method of claim 3 wherein associating each feature of the plurality of features with the at least one neuron of the plurality of input neurons comprises associating a numeric result of a respective mapping function for each feature of the plurality of features with at least one neuron of the plurality of input neurons.

5. The method of claim 3 wherein the target feature comprises at least one of: a user profile detail, a social graph connection, a topic of interest for a user, or a historic action of the user.

6. The method of claim 3 wherein the content item feature comprises at least one of: content text, content pixels, or content metadata.

7. The method of claim 1 further comprising:
receiving a request that is initiated by a given target of the subset of targets;
sending the first content item to the given target.

8. The method of claim 7 wherein:
receiving the request from the given target comprises receiving at least one context feature that is incidental to a session of the given target;
the method further comprises selecting the first content item based on the at least one context feature.

9. The method of claim 8 wherein the context feature comprises at least one of:
a device attribute, a time of day, a day of week, or a geographic location.

10. A method comprising:
storing a plurality of known targets, a plurality of inventoried content items, and a plurality of historical occurrences, each of which indicates:
a content item of the plurality of inventoried content items that was sent,
a target of the plurality of known targets to whom the content item was sent, and
whether or not the target responded to the content item;
based on the plurality of historical occurrences, training an artificial neural network to generate relevance scores for pairings of a target and a content item;
using a plurality of expansion techniques to identify an expanded plurality of targets for a first content item;
for each target in the expanded plurality of targets, providing a plurality of inputs to the artificial neural network to generate a relevance score that indicates a suitability of the first content item for said each target, wherein the plurality of inputs are based on the first content item and said each target;
generating a ranking of the expanded plurality of targets based on the relevance score generated for each target of the expanded plurality of targets;
selecting, based on the ranking, a subset of targets from the expanded plurality of targets;
storing an association between each target in the subset of targets with the first content item;
wherein the method is performed by one or more computers.

11. The method of claim 10 wherein the first content item is not indicated by any historical occurrence in the plurality of historical occurrences.

12. The method of claim 10, further comprising:
training a shared artificial neural network based on the plurality of historical occurrences that indicate different targets;
training a plurality of target-specific artificial neural networks, each: (a) corresponding to a different target from a second subset of targets of the plurality of known targets and (b) trained based on historical occurrences that indicate the different target;
wherein providing the plurality of inputs to the artificial neural network for each target in the expanded plurality of targets comprises:
for each target of a first subset of targets of the plurality of known targets, providing the plurality of inputs to the shared artificial neural network; and
for each target of the second subset of targets of the plurality of known targets, providing the plurality of inputs to a corresponding target-specific artificial neural network that is based the shared artificial neural network.

13. The method of claim 10 wherein the target responded to the content item comprises the target clicked on an element of a web page.

14. The method of claim 10 wherein training based on the plurality of historical occurrences comprises training based on historical occurrences whose age does not exceed a threshold.

15. One or more non-transient computer-readable media storing instructions that, when executed by one or more processors, cause:

using a plurality of expansion techniques to identify an expanded plurality of targets that do not satisfy targeting criteria that are specified by a content delivery campaign for a first content item;

for each target in the expanded plurality of targets that do not satisfy said targeting criteria, providing a plurality of inputs to an artificial neural network to generate a relevance score that indicates a suitability of the first content item for said each target, wherein the plurality of inputs are based on the first content item and said each target;

generating a ranking of the expanded plurality of targets that do not satisfy said targeting criteria based on the relevance score generated for each target of the expanded plurality of targets that do not satisfy said targeting criteria;

selecting, based on the ranking, a subset of targets that do not satisfy said targeting criteria from the expanded plurality of targets that do not satisfy said targeting criteria;

storing an association between each target in the subset of targets that do not satisfy said targeting criteria with the first content item.

16. The one or more non-transient computer-readable media of claim 15 wherein the instructions further cause:

storing a plurality of known targets, a plurality of inventoried content items, and a plurality of historical occurrences, each of which indicates:
- a content item of the plurality of inventoried content items that was sent,
- a target of the plurality of known targets to whom the content item was sent, and
- whether or not the target responded to the content item;

based on the plurality of historical occurrences, training the artificial neural network to generate relevance scores for pairings of a target and a content item.

17. The one or more non-transient computer-readable media of claim 16 wherein the instructions further cause:

training a shared artificial neural network based on the plurality of historical occurrences that indicate different targets;

training a plurality of target-specific artificial neural networks, each: (a) corresponding to a different target from a second subset of targets of the plurality of known targets and (b) trained based on historical occurrences that indicate the different target;

wherein providing the plurality of inputs to the artificial neural network for each target in the expanded plurality of targets comprises:
- for each target of a first subset of targets of the plurality of known targets, providing the plurality of inputs to the shared artificial neural network; and
- for each target of the second subset of targets of the plurality of known targets, providing the plurality of inputs to a corresponding target-specific artificial neural network that is based the shared artificial neural network.

18. The one or more non-transient computer-readable media of claim 15 wherein based on the relevance score generated for each target of the expanded plurality of targets comprises based on the relevance score generated for each target of the expanded plurality of targets for the first content item exceeding the relevance scores generated for the target for one or more other content items that were previously provided to the target.

19. The one or more non-transient computer-readable media of claim 15 wherein:

the artificial neural network comprises a plurality of input neurons arranged in an input layer;

the instructions further cause associating each feature of a plurality of features with at least one neuron of the plurality of input neurons;

the plurality of features comprises at least one of each of:
- a target feature of a particular target, and
- a content item feature of the first content item.

20. The one or more non-transient computer-readable media of claim 15 wherein the instructions further cause:

receiving a request that is initiated by a given target of the subset of targets;

sending the first content item to the given target.

* * * * *